United States Patent Office 2,842,830
Patented July 15, 1958

---

2,842,830

PROCESS FOR THE MANUFACTURE OF SELENIUM RECTIFIER

Otto J. Klein, Nurnberg, Germany, assignor to International Standard Electric Corporation, New York, N. Y., a corporation of Delaware No Drawing. Application September 16, 1954
Serial No. 456,610

Claims priority, application Germany October 2, 1953

4 Claims. (Cl. 29—25.3)

This invention relates to a process for the manufacture of selenium rectifier plates and mainly to measures for producing the counter electrode.

It is well known that in selenium rectifier plates the base electrode is employed as one terminal electrode, while a metallic layer consisting, for example, of a low-melting alloy of the metals tin, lead, bismuth, or cadmium, deposited upon the selenium layer, serves as the second terminal electrode. Deposition of this alloy upon the selenium's surface is carried out, for example, by a spraying process. In order to improve the properties of the rectifier plate a small quantity of an additional substance, such as thallium or indium, may be used to improve the conductivity of the plate. It was also found that for the purpose of forming a good reaction layer between the selenium and the counter electrode metal, it would be advantageous to raise the temperature of the counter electrode for a certain time above its melting point so that the electrode is melted. Selenium rectifier plates produced in such a way are especially well suited for application at high specific loads.

The procedure of melting-on the counter electrode, however, is accompanied by the disadvantage that after the melting-on process the selenium rectifier has lost its self-healing properties at faulty places. It is known that selenium rectifier plates have the property that short-circuits (which occur at faulty places) in the selenium layer are self-healing, as a section of the counter electrode is burned away while a load is placed on the rectifier. This desirable property is lost, if the counter electrode is melted-on, probably because after the melting-on process the counter electrode metal forms a compact layer of such high transversal conductivity that, if a puncture occurs at a faulty point, the energy is too rapidly dissipated from the center of the puncture so that a melting or burning-off of the counter electrode metal at this spot does not take place anymore. It was also found that even though additions of thallium to the counter electrode metal are advantageous for the formation, they are undesirable during the continuous operation of the rectifier. It has therefore been proposed to conduct the formation of the rectifier plate in a way that during the formation process a metallic foil containing thallium is pressed against the selenium's surface and that following this formation said metal foil is substituted for by one of the usual sprayed metal layer.

The foregoing method, however, has the disadvantage that a reaction layer forming itself particularly from the metal of the counter electrode and the selenium is either established insufficiently by the metal foil or else is damaged while it is pulled-off.

These described disadvantages are avoided by the present invention. The process according to this invention is characterized in that the counter electrode used in the formation process is, after this formation has been completed, heated to its melting point, thereafter thrown-off and replaced by a sprayed-on counter electrode of preferably different composition. Thus during the melting-on process a well shaped and even reaction layer is formed between the counter electrode metal and the selenium, which is neither damaged nor removed, when the counter electrode metal is thrown-off. The successive mounting of a sprayed-on and therefore porous electrode restores the self-healing properties of the rectifier plate again and thereby combines the favorable characteristics of selenium rectifier plates having a sprayed-on counter-electrode with those of melted-on counter electrodes. In addition thereto the process according to this invention can at the same time be used to replace the counter electrode having a higher content of thallium, which is used for the formation process, by a counter electrode containing a lower amount of thallium or none at all, so that no undesired phenomena occur during continuous operation of the rectifier. Consequently an alloy with higher contents of thallium is used for the first counter electrode, then the rectifier while eventually heated at the same time up to the melting point of the counter electrode (e. g. by the forming current or by other heating means) is subject to an electrical formation; subsequently the counter electrode being in a liquid state is thrown-off, and finally another counter electrode containing less thallium is sprayed upon the rectifier plate obtained in this manner. Hereby it is important that the remaining counter electrode should not be a compact metallic layer and therefore is appropriately deposited by spraying. In both cases an eutectic alloy of 32.25% cadmium and 67.75% tin with a melting point of 352.4° C. has proved to be especially well suited as metal for the counter electrode.

The first counter electrode can be deposited, for example, by spraying. Before or after the first counter electrode has been deposited the rectifier plate is appropriately placed upon a movable revolving base, where it is subject to the electrical formation up to the desired inverse voltage either in the cold or at temperatures reaching up to the counter electrode's melting point. If the first counter electrode is heated by the current used for the formation of the rectifier or by other heating means to a liquid state, the excessive metal of the electrode is thrown-off, e. g. by fast rotation of the rectifier plate. If the counter electrode metal is in the solid state, the rectifier plate is heated to melt the counter electrode metal, which is thrown-off in the manner described. In this way at least 80% of the amount of metal of the counter electrode is removed. After the selenium's surface has thus been largely freed of the counter electrode metal, the final counter electrode is, after the rectifier plate has cooled-off, deposited by a spraying process, e. g. by using the same alloy of tin and cadmium with a melting point located at 352.4° F. In case the first counter electrode contains a certain amount of thallium for improving the formation process, the contents of thallium of the second counter electrode should preferably be lessened. It is not absolutely necessary, however, that the second counter electrode consist of the same substances as the first one. An alloy, the melting point of which is lower than 352.4° F., could, for example, also be used.

Selenium rectifier plates manufactured in a process according to this invention not only show a good puncture strength but also can be loaded with relatively high currents without the risk of destruction.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In the process of manufacturing a selenium rectifier the steps of applying a first counter electrode to the selenium, electro-forming the rectifier, melting the counter electrode on said selenium, removing the counter electrode and thereafter applying a porous second counter electrode.

2. A process according to claim 1 in which the second counter electrode is applied by spraying.

3. A process according to claim 1 in which said first counter electrode is removed by being thrown off.

4. A process according to claim 3 in which said heating is produced by the electro-forming current.

References Cited in the file of this patent
UNITED STATES PATENTS

| | | |
|---|---|---|
| 2,193,610 | Wilson | Mar. 12, 1940 |
| 2,321,523 | Saslaw | June 3, 1943 |
| 2,644,915 | Thurber et al. | July 7, 1953 |